(12) United States Patent
Liu et al.

(10) Patent No.: US 10,042,992 B2
(45) Date of Patent: *Aug. 7, 2018

(54) IMAGE BASED CAPTCHA CHALLENGES

(71) Applicant: Google Inc., Mountain View, CA (US)

(72) Inventors: Wei Liu, San Jose, CA (US); Vinay Damodar Shet, Millbrae, CA (US); Ying Liu, Sunnyvale, CA (US); Aaron Malenfant, Redwood City, CA (US); Haidong Shao, Sunnyvale, CA (US); Hongshu Liao, Mountain View, CA (US); Jiexing Gu, San Jose, CA (US); Edison Tan, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/700,395

(22) Filed: Sep. 11, 2017

(65) Prior Publication Data

US 2017/0372048 A1    Dec. 28, 2017

Related U.S. Application Data

(63) Continuation of application No. 14/958,073, filed on Dec. 3, 2015, now Pat. No. 9,760,700.

(51) Int. Cl.
*G06F 7/04* (2006.01)
*G06F 21/31* (2013.01)
(Continued)

(52) U.S. Cl.
CPC ............ *G06F 21/316* (2013.01); *G06F 21/36* (2013.01); *G06N 7/005* (2013.01); *G06N 99/005* (2013.01);
(Continued)

(58) Field of Classification Search
CPC ...... G06F 21/316; G06N 99/005; H04L 63/12
(Continued)

(56) References Cited

U.S. PATENT DOCUMENTS 8,132,255 B2    3/2012  Mates
8,607,331 B2   12/2013  Sun et al.
(Continued)

FOREIGN PATENT DOCUMENTS

EP          2784734        10/2014

OTHER PUBLICATIONS

Chen et al., "A Study on Captcha Recognition" 2014 Tenth International Conference on Intelligent Information Hiding and Multimedia Signal Processing Year: 2014 pp. 395-398.*
(Continued)

*Primary Examiner* — Roderick Tolentino
(74) *Attorney, Agent, or Firm* — Dority & Manning, P.A.

(57) ABSTRACT

Systems and methods of determining image characteristics are provided. More particularly, a first image having an unknown characteristic can be obtained. The first image can be provided to a plurality of user devices in a verification challenge. The verification challenge can include one or more instructions to be presented to a user of each user device. The instructions being determined based at least in part on the first image. User responses can be received, and an unknown characteristic of the first image can be determined based at least in part on the received responses. Subsequent to determining the unknown characteristic of the first image, one or more machine learning models can be trained based at least in part on the determined characteristic.

20 Claims, 7 Drawing Sheets

(51) Int. Cl.
*G06F 21/36* (2013.01)
*H04L 29/06* (2006.01)
*G06N 7/00* (2006.01)
*G06N 99/00* (2010.01)

(52) U.S. Cl.
CPC ...... *H04L 63/12* (2013.01); *G06F 2221/2133* (2013.01)

(58) Field of Classification Search
USPC ...................................................... 726/26–30
See application file for complete search history.

(56) References Cited

U.S. PATENT DOCUMENTS

| | | | | |
|---|---|---|---|---|
| 8,621,578 | B1* | 12/2013 | Blomquist | G06F 21/36 713/182 |
| 8,793,761 | B2* | 7/2014 | Chow | G06F 21/36 726/3 |
| 8,875,239 | B2* | 10/2014 | Chow | G06F 21/36 434/362 |
| 8,904,493 | B1* | 12/2014 | Dibble | H04L 63/08 726/4 |
| 8,925,057 | B1* | 12/2014 | Ansari | G06F 21/31 382/181 |
| 2009/0328150 | A1 | 12/2009 | Gross | |
| 2012/0054834 | A1* | 3/2012 | King | G06F 21/31 726/4 |
| 2014/0123261 | A1* | 5/2014 | Blair | H04L 51/00 726/7 |
| 2015/0161365 | A1* | 6/2015 | Hulten | G06F 21/31 726/2 |
| 2016/0063235 | A1* | 3/2016 | Tussy | G06F 21/34 726/6 |
| 2016/0239654 | A1* | 8/2016 | Johri | G06F 21/36 |

OTHER PUBLICATIONS

Zhu et al., "Captcha as Graphical Passwords—A New Security Primitive Based on Hard AI Problems" IEEE Transactions on Information Forensics and Security Year: 2014, vol. 9, Issue: 6 pp. 891-904.*

Chen et al., "A Study on Captcha Recognition", 10$^{th}$ International Conference on Intelligent Information Hiding and Multimedia Signal Processing, 2014, pp. 395-398.

Da Silva et al., "A Hybrid Method for Image Taxonomy: Using CAPTCHA for Collaborative Knowledge Acquisition", Association for the Advancement of Artificial Intelligence 2006 Fall Symposium on Semantic Web for Collaborative Knowledge Acquisition, Oct. 13-15, 2006, Washington, DC, pp. 17-23.

International Search Report and Written Opinion from PCT/US2016/064390 dated Jan. 24, 2017—6 pages.

Zhu et al., "Captcha as Graphical Passwords—A New Security Primitive Based on Hard AI Problems" IEEE Transactions on Information Forensics and Security, vol. 9, Issue 6, 2014, pp. 891-904.

* cited by examiner

IMAGE BASED CAPTCHA CHALLENGES

PRIORITY CLAIM

The present application is a continuation of U.S. application Ser. No. 14/958,073 having a filing date of Dec. 3, 2015. Applicants claim priority to and benefit of all such applications and incorporate all such applications herein by reference.

FIELD

The present disclosure relates generally to CAPTCHA challenges, and more particularly to determining image characteristics using image based CAPTCHA challenges.

BACKGROUND

Trust is an asset in web-based interactions. For example, a user must trust that an entity provides sufficient mechanisms to confirm and protect her identity or other confidential information in order for the user to feel comfortable interacting with such entity. Further, an entity that provides a web-resource must be able to block automated attacks that attempt to gain access to the web-resource for malicious purposes. Thus, sophisticated authentication mechanisms that can discern between a resource request originating from a human being and a request generated by an automated machine are a vital tool in ensuring that web-resources are protected from automated attacks and developing the necessary relationship of trust between a resource provider and a user.

CAPTCHA systems ("completely automated public Turing test to tell computers and humans apart") can provide such an authentication mechanism. One goal of a CAPTCHA system is to exploit situations in which it is known that humans perform tasks better than automated machines. Thus, as part of a verification process, CAPTCHA systems can provide a challenge that is solvable by a human but generally unsolvable by a machine.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of determining image characteristics. The method includes obtaining, by the one or more computing devices, a first image having an unknown characteristic. The method further includes providing, by the one or more computing devices, the first image to a plurality of user devices in a verification challenge. The verification challenge comprises one or more instructions to be presented to a user of each user device. The instructions are determined based at least in part on the first image. The method further includes receiving, by the one or more computing devices, a response to the verification challenge from at least a subset of the plurality of user devices. The method further includes determining, by the one or more computing devices, the unknown characteristic of the first image based at least in part on the received responses. The method further includes subsequent to determining, by the one or more computing devices, the unknown characteristic of the first image, training, by the one or more computing devices, one or more machine learning models based at least in part on the determined characteristic.

Other example aspects of the present disclosure are directed to systems, apparatus, tangible, non-transitory computer-readable media, user interfaces, memory devices, and electronic devices for determining image characteristics using image based verification challenges.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
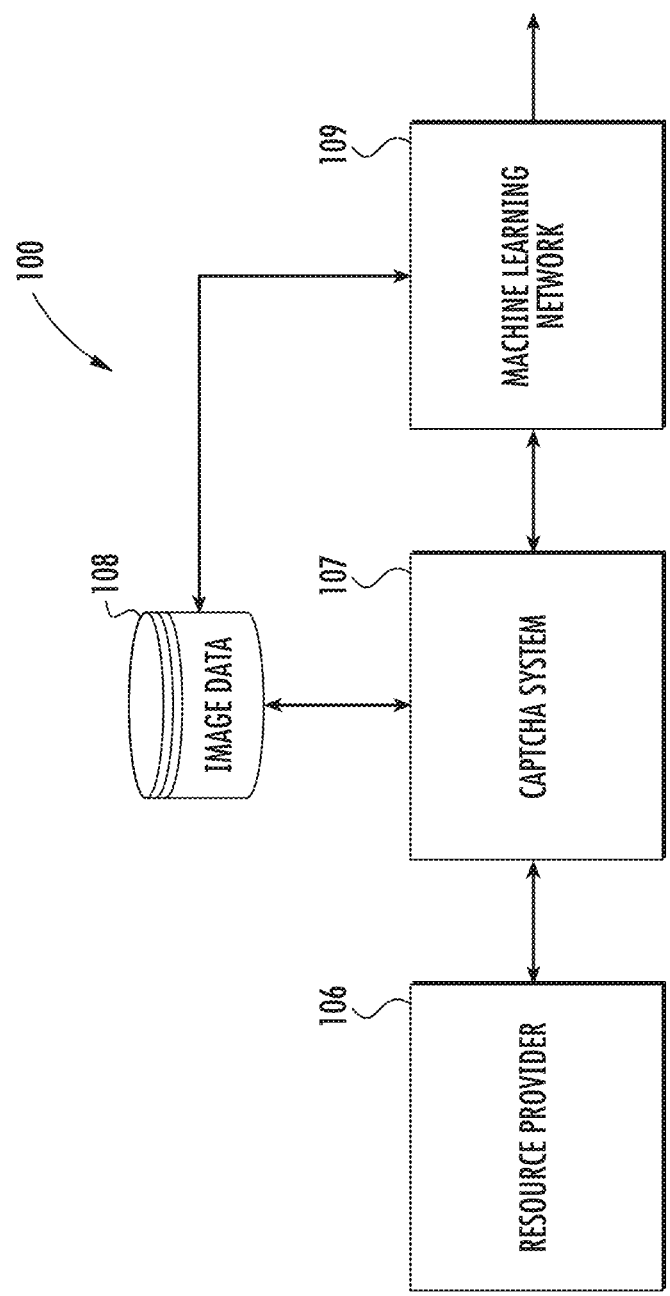
FIG. 1 depicts an overview of an example system for determining image characteristics using image based CAPTCHA challenges according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to determining image classifications based at least in part on an image based verification challenge. For instance, an image having one or more unknown characteristics can be obtained and provided to a plurality of user devices as part of a verification challenge, such as a completely automated public Turing test to tell computers and humans apart (CAPTCHA) challenge. In particular, the challenge can include one or more instructions prompting the user to interact with the first image in a specified manner. Responses to the challenge can be obtained from each of the plurality of user devices. At least one of the one or more unknown characteristics of the first image can then be determined based at least in part on the responses from the plurality of user devices. Once the at least one unknown characteristic is determined, the first image can be used to train one or more machine learning models.

More particularly, a user can attempt to access an online service or resource through a user device. As used herein, a user device can be a laptop computer, desktop computer, smartphone, tablet, wearable computing device, or any other suitable user computing device. In order to access the online service, the user can first be required to interact with a computerized CAPTCHA system to verify the human status of the user, thereby preventing "bots" from damaging the online service. For instance, the CAPTCHA system can provide a verification challenge to the user, and the user can gain access to the online service if the user "passes" the challenge. In some implementations, the verification challenge can be an image based challenge including instructions prompting the user to solve the challenge through interaction with one or more images.

For instance, as indicated, one or more first images having one or more unknown characteristics can be provided to the user in the verification challenge. For instance, an unknown characteristic can be an undetermined classification associated with an image. In this manner, an image having one or more unknown characteristics can be an image for which classification of the contents depicted in the image cannot be determined within a reasonable certainty. As another example, the unknown characteristic can be associated with a location of an object or item in the image. In some implementations, whether a characteristic of an image is known or unknown can be determined using one or more machine learning models. For instance, one or more machine learning models (e.g. image classification, object detection, or other models) can be configured to receive images as input, and to identify, categorize, classify, or otherwise detect one or more objects or items depicted in the images as output. The models can be further configured to determine a certainty probability corresponding to a degree of certainty that the output of the model is correct. In some implementations, a characteristic of an image can be unknown if the image has an associated certainty probability below a threshold. For instance, the first image having one or more unknown characteristics can be an image having a certainty probability below a threshold.

In some implementations, a plurality of second images can also be obtained and at least a subset of the plurality of second images can be provided to the plurality of user devices for use in the verification challenge. The plurality of second images can be images having known characteristics. For instance, the plurality of second images can be images having an associated certainty probability above the threshold. As another example, the second images can be images having associated descriptive information, such as metadata or other information describing the contents of the images. In this manner, at least a subset of the plurality of second images can be provided along with the first image in the verification challenge.

The verification challenge can be an image based challenge. In some implementations, the verification challenge can be associated with the unknown characteristic of the first image. For instance, the verification challenge can include instructions prompting the user to interact with at least a portion of the first image in a specified manner. In particular, the instructions may prompt the user to interact with at least a portion of the first image that meets a criterion. For instance, the instructions associated with the verification challenge may prompt a user to locate and interact with a portion of the first image that depicts a particular object. As another example, the verification challenge may prompt the user to interact with at least one of the first image or the second images. For instance, the verification challenge may prompt a user to select all of the images that depict a particular object or item, or that are associated with a particular category or classification. In this manner, the verification challenge can be tailored such that the responses to the verification challenge can be used to determine or infer the unknown characteristic. As yet another example, in some implementations, a reference image may be provided to the user in the verification challenge along with the first and second images. In such implementations, the instructions associated with the verification challenge may prompt a user to select each of the first and second images that depict an object or item from the same category or classification as an object or item depicted in the reference image. As yet another example, a verification challenge may include one or more images and instructions prompting a user to select one or more categories from a list of categories that describe the images.

The verification challenge can be provided to one or more user devices attempting to gain access to one or more online services. Responses to the verification challenge can then be received from the user devices. For instance, if the verification challenge prompts the user to select one or more images that meet a specified criterion, the response from the user can include data indicative of the images that the user selected. The response from the user can be used to determine whether access to the online service should be granted to the user device. For instance, if the response satisfactorily completes or solves the selected challenge, then the computerized CAPTCHA system can verify the user computing device. As an example, once the computerized CAPTCHA system has been sufficiently convinced that the user device is operated by a human (e.g. based on the response to the verification challenge), the computerized CAPTCHA system can provide a verification token or certificate to the user computing device. The user computing device can then provide the verification token to a resource provider associated with the online service. In turn, the resource provider can confirm the validity of the verification token with the computerized CAPTCHA system. Upon confirmation of token validity, the resource provider can provide the resource to the user device. In some implementations, the user responses to the verification challenge may not be dispositive in determining whether to verify the user device. For instance, a user may be rejected (e.g. not verified) even if the user correctly solves the verification challenge. As another example, the user may be verified even if the user does not correctly solve the verification challenge. In such implementations, one or more additional signals associated with the user and/or the user computing device can be used (e.g. in conjunction with the user responses) to determine whether to verify the user. For instance, a user who nearly solves the verification challenge may be verified based at least in part on the one or more additional signals.

The responses to the verification challenge can further be used to determine or infer the unknown characteristic of the first image(s). In particular, the unknown characteristic of the first image(s) can be determined or inferred when a threshold number of user responses are indicative of a characteristic of the first image(s) For instance, user interaction with the first image(s) in view of the verification challenge can be indicative of an object or item depicted in the image(s). As an example, if an image based verification challenge includes instructions prompting a user to select all of the images that depict a tiger, whether or not the user selects the first image in response to the verification challenge can be indicative of whether the first image depicts a tiger. In this manner, if enough users (e.g. a number of users above a threshold) select the first image in response to receiving the verification challenge, it can be inferred that the image depicts a tiger. If the number of users who select the first image is below the threshold, it can be inferred that the first image does not depict a tiger. In some implementations, the inference can be made based at least in part on a percentage of users who select the image. As another example, in implementations wherein a verification challenge includes instructions prompting a user to locate and interact with a portion of the first image that depicts a particular object, the user selections can be used to determine the placement of the object in the first image.

In some implementations, the user responses to the verification challenge can be used to confirm the known images. For instance, the user responses to the verification challenge may be used to verify that the known characteristic of the known images are correct. In this manner, if enough user responses associated with a known image indicate that the known characteristics are incorrect, the image can be removed from the set of known images. As another example, the known characteristic may be adjusted or refined based at least in part on the user responses.

Once the unknown characteristic is determined, the first image(s) can be used to train one or more machine learning models. In particular, data indicative of the first image(s) can be added to a corpus of training data used to train the models. For instance, the machine learning models can be used in image recognition applications, object detection applications, and/or other suitable applications. In particular the machine learning models can be trained using a set of training data. Such training data can include data (e.g. vector data or other data) indicative of one or more images having known characteristics. For instance, the training data can include data indicative of one or more images, the contents of which are already known. In this manner, the training data can include a plurality of input/output pairs, wherein the input is the vector data indicative of an image and the output is data indicative of the contents of the image (e.g. one or more items depicted in the image). The machine learning models can be trained based at least in part on the input/output pairs of the training data. For instance, the vector data associated with an image can be input into the machine learning model(s), and the output of the model can be compared to the output of the training data. The model(s) can be adjusted or refined based at least in part on the comparison.

With reference now to the figures, example aspects of the present disclosure will be discussed in more detail. For instance, FIG. 1 depicts an overview of an example system 100 for providing image based verification challenges. In particular, system 100 can include a computerized CAPTCHA system 102, a machine learning network 104, and a resource provider 106. In some implementations, CAPTCHA system 102, machine learning network 104, and/or resource provider 106 can communicate with each other over a network.

CAPTCHA system 102 can be implemented using one or more computing devices, such as, for example, one or more servers. CAPTCHA system 102 can be configured to determine verification CAPTCHA challenges and to provide such challenges to a user device in response to a verification request from a user device. In some implementations, the verification challenges can be image based CAPTCHA challenges. For instance, the CAPTCHA challenge can include providing one or more known and/or unknown images to a user. Such image based challenges can have associated instructions prompting a user to solve the challenge by interacting with one or more images. For instance, as indicated above, a challenge may include instructions prompting a user to select all of the presented images that match, or that belong to a particular category or classification. As another example, the challenge may include instructions prompting a user to select or otherwise interact with a portion of an image that depicts a particular item, object, animal, etc.

As shown, CAPTCHA system 102 can access image data from an image database 108. Image database 108 can include a plurality of images to be used in one or more verification challenges. In example implementations, image database 108 can be a single database located in a single location, or can include multiple databases spread across multiple locations. In particular, image database 108 can include known images and unknown images. Known images can include images that have one or more known characteristics. For instance, known images can be images that have been classified or categorized. In some implementations, the one or more known characteristics can be determined based at least in part on metadata or other descriptive information associated with the image. In some implementations, the one or more known characteristics can be determined based at least in part on machine learning network 104. For instance, machine learning network 104 can be used to classify, categorize, identify, or otherwise detect one or more object depicted in the image.

Image database 108 can further include one or more unknown images having one or more unknown characteristics. Similar to the known images, the unknown characteristic(s) can be determined to be unknown based at least in part on a lack of metadata or other descriptive information associated with the unknown characteristic. As another example, the unknown characteristic(s) can be determined to be unknown based at least in part on machine learning network 104.

In some implementations, known and/or unknown images can be determined relative to the verification challenge. For instance, in implementations wherein the instructions associated with a verification challenge prompt the user to select each image that depicts a tiger, the known images can include one or more images from image database 108 that are already known to depict a tiger and/or known to not depict a tiger. In this manner, the unknown image(s) can include an image wherein the contents depicted in the image are unknown. In some implementations, the verification challenge can then be used to determine or otherwise infer the contents depicted in the unknown image(s).

Machine learning network 104 can include one or more machine learning models, such as one or more neural networks. For instance, the one or more models can be configured to classify images, and/or to detect objects depicted within the images. In this manner, machine learning network 104 can be configured to receive an image as input, and to provide an image classification as output. In some implementations, machine learning network 104 can further be configured to provide a certainty probability or other indicator associated with the output specifying a confidence level for the output. In some implementations, machine learning network 104 can be configured to communicate with image database 108 to classify one or more images associated with image database 108. In this manner, in some implementations, an unknown image can be an image having an associated certainty probability below a threshold, and a known image can be an image having an associated certainty probability above the threshold.

Machine learning network 104 can further be configured to train the one or more machine learning models. For instance, various suitable algorithms can be used to refine or adjust the machine learning models based at least in part on a set of training data. In this manner, the training data can be used to improve the machine learning models. It will be appreciated that although machine learning network 104 is illustrated as a separate and distinct system from CAPTCHA system 102, in some implementations, machine learning network 104 may be implemented within CAPTCHA system 102.

System 100 further includes a resource provider 106. Resource provider 106 can be associated with an online or other service. Resource provider 106 can receive a request from a user device for access to the online service. In response to the request, resource provider 106 can coordinate with CAPTCHA system 102 to provide a verification challenge to the user device. In this manner, CAPTCHA system 102 can determine a verification challenge and provide the verification challenge to the user. In some implementations, CAPTCHA system 102 can determine a verification challenge based at least in part on an unknown image. For instance, CAPTCHA system 102 can tailor the verification challenge such that the user response to the verification challenge can be used as evidence of a classification or categorization of the unknown image. In some implementations, the verification challenge can be determined based at least in part on a confidence level that the request was provided by a human rather than a bot. For instance, the difficulty of the verification challenge can be adjusted based at least in part on the confidence level.

The user response to the verification challenge can be used to determine the unknown characteristics(s) of the unknown image(s). For instance, the user response can be used as evidence associated with a classification of an unknown image. For instance, in implementations wherein a verification challenge includes instructions to select all images that depict a tiger, whether or not the user selects the unknown image can be indicative of whether or not an unknown image depicts a tiger. In this manner, the unknown images can be presented to a plurality of users in one or more verification challenges, and the responses from the users to the one or more verification challenges can be used to infer the unknown characteristic of the image. For instance, if enough users (e.g. a high enough percentage of users, and/or a number of users above a threshold) select the unknown image in response to the verification challenge instructing the user to select the images containing a tiger, it can be inferred that the unknown image depicts a tiger.

Once the unknown characteristic can be inferred with a reasonable certainty, the image can be annotated to indicate a classification of the image. The image can then be included in the training data set used to train the machine learning model(s) of machine learning network 104. In this manner, the image can be used to improve the classification capabilities of the models. In some implementations, the annotated image can further be used in future verification challenges determined by CAPTCHA system 102. For instance, the annotated image can subsequently be used as a known image in one or more verification challenges.

Figure 2:
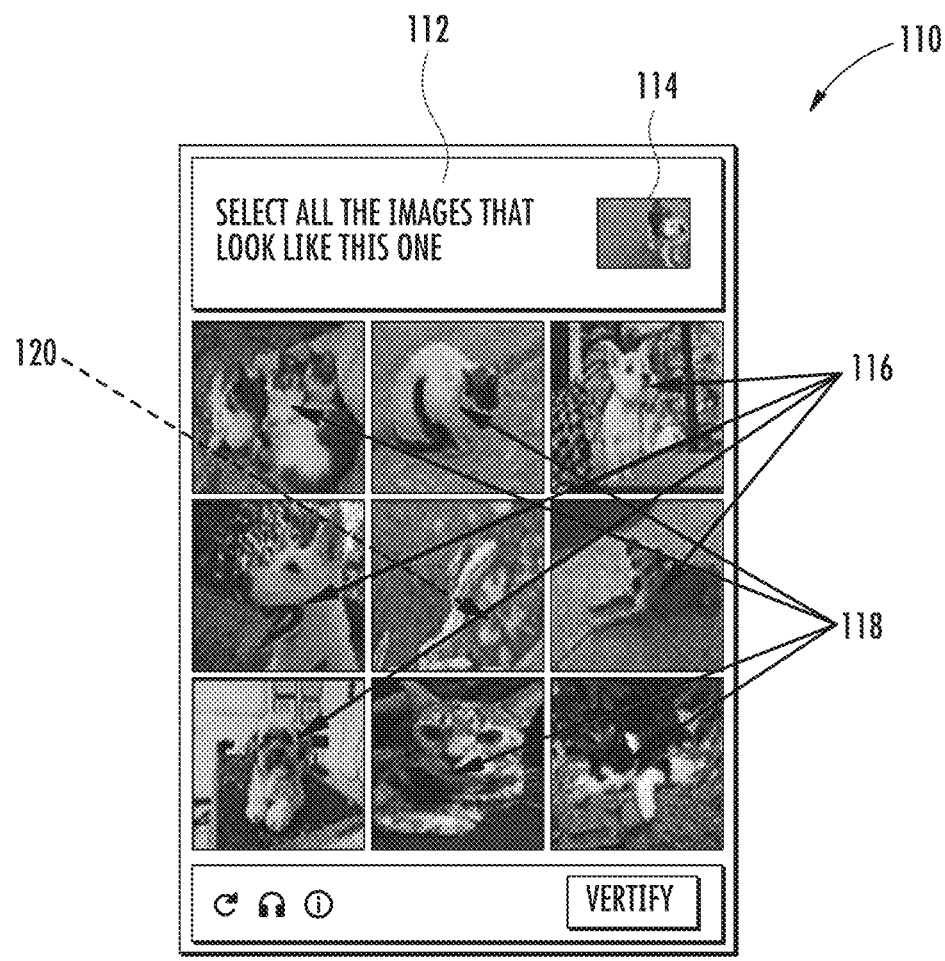
FIGS. 2-4 depict example CAPTCHA challenges according to example embodiments of the present disclosure.

FIG. 2 depicts an example image based CAPTCHA challenge 110 according to example embodiments of the present disclosure. As shown, CAPTCHA challenge 110 includes instructions 112 and an associated reference image 114 that is known to depict a dog. Instructions 112 prompt the user to select all the images that "look like" reference image 114. CAPTCHA challenge 110 further includes known images 116 and negative known images 118. Known images 116 are images that are known to depict a dog, and negative known images 118 are images that are known to not depict a dog. Although each negative known image 118 depicts cats, it will be appreciated that negative known images may depict one or more other objects, items, plants, animals, humans, etc. CAPTCHA challenge 110 further depicts an unknown image 120. Unknown image 120 can be an image wherein the contents of the image are unknown. As shown in FIG. 2, unknown image 120 depicts a lizard.

As described above, upon receiving CAPTCHA challenge 110, a user can follow the instructions and select one or more images that, in the user's opinion, "look like" reference image 114. The user's selections can determine whether the user is granted access to the resources or service provided by a resource provider. For instance, if the user "passes" the challenge, the user can be granted access to the resource or service. For instance, the user may pass the challenge if the user selects the correct combination of images, or close to the correct combination of images. In CAPTCHA challenge 110, the user will pass if the user selects each known image 116 and no negative known images 118. In some implementations, if the user does not "pass," the user can be presented a different CAPTCHA challenge.

As unknown image 120 does not depict a dog, it is unlikely that a majority of human users who respond to this verification challenge will select unknown image 120 in response to CAPTCHA challenge 110. In this manner, it can then be inferred that unknown image 120 does not depict a dog. Similarly, in instances wherein an unknown image does depict a dog, it is likely that a majority of the human users will select the unknown image in response to the CAPTCHA challenge. In this manner, it can then be inferred that the unknown image does depict a dog.

Once the inference is made that unknown image 120 does not depict a dog, it can be used in subsequent verification challenges. For instance, it can be used as an unknown image in a verification challenges having reference images that do not depict dogs. In some implementations, unknown image 120 can subsequently be used as a negative known image in verification challenges that have references images that depict dogs.

Figure 3:
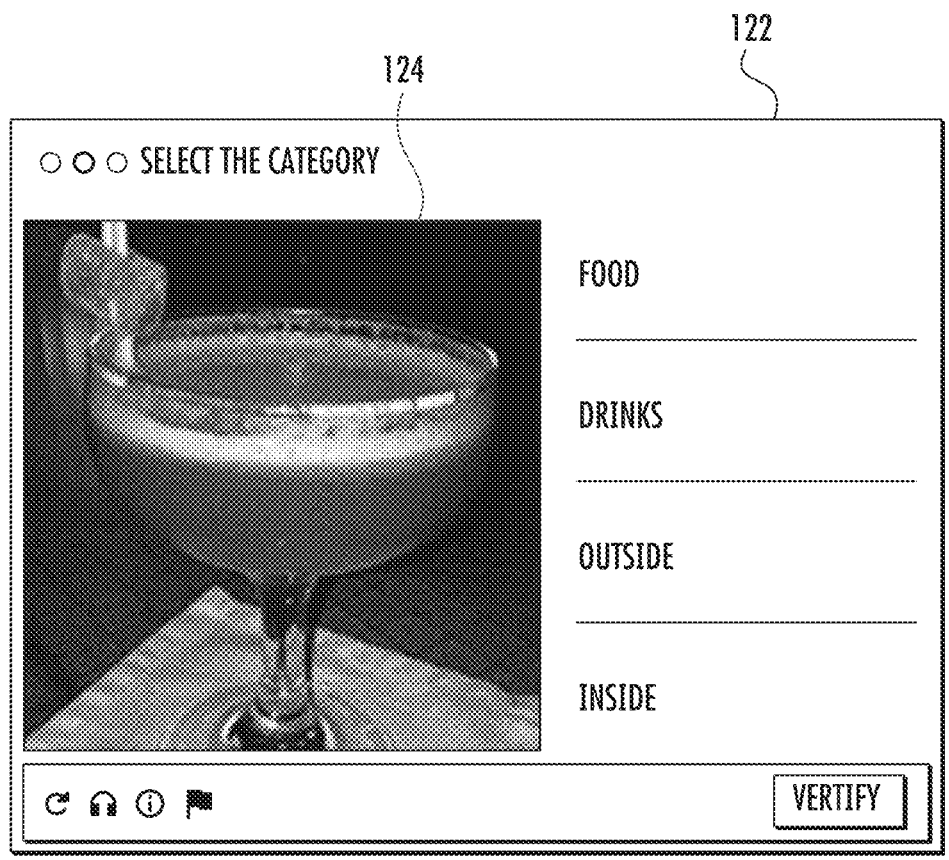
Figure 4:
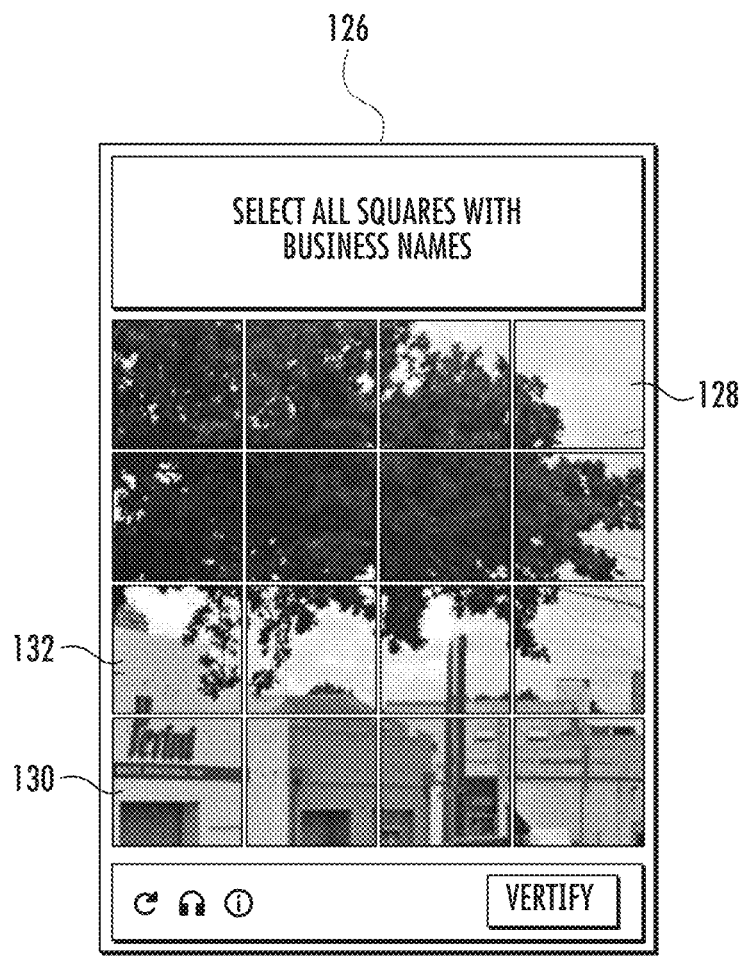

FIGS. 3 and 4 depict additional example image based CAPTCHA challenges according to example embodiments of the present disclosure. For instance, FIG. 3 depicts a CAPTCHA challenge 122 having a reference image 124 that depicts a beverage. The instructions prompt the user to select one or more appropriate categories associated with reference image 124. One or more inferences and/or confirmations can be made relating to reference image 124 based at least in part on the user's selections. FIG. 4 depicts a CAPTCHA challenge 126 that depicts a reference image 128 that depicts a scene. As shown, reference image 128 is divided into a plurality of regions (e.g. squares). CAPTCHA challenge 126 further includes instructions prompting the user to "select all squares with business names." In this manner, one or more inferences may be made as to the location of the business names in reference image 128 based on the user responses. For instance, a majority of human users will likely select image squares 130 and 132 in response to the instructions. In this manner, it can then be inferred that the business name is located in the bottom left portion of reference image 128 in image squares 130 and 132.

Figure 5:
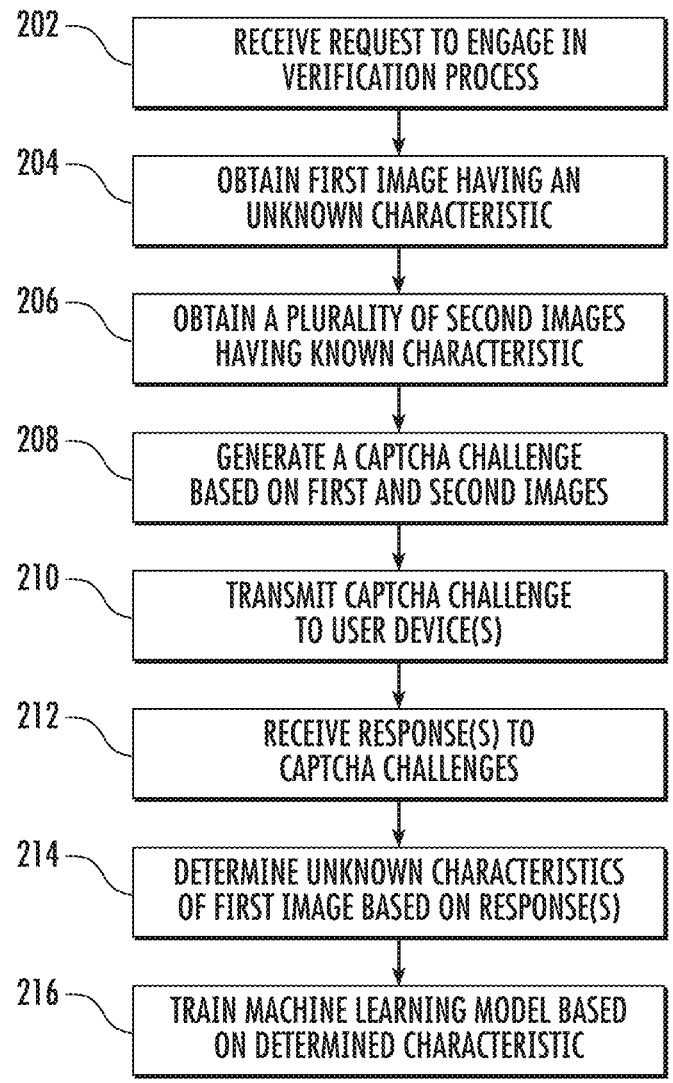
FIG. 5 depicts a flow diagram of an example method of determining image characteristics based on CAPTCHA challenge results according to example embodiments of the present disclosure.

FIG. 5 depicts a flow diagram of an example method (200) of determining one or more image characteristics using a computerized CAPTCHA system according to example embodiments of the present disclosure. Method (200) can be implemented by one or more computing devices, such as one or more of the computing devices depicted in FIG. 7. In addition, FIG. 5 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (202), method (200) can include receiving a request to engage in a verification process. For instance, the request can be provided by a user device operated by a user seeking to gain access to an online service or resource. At (204), method (200) can include obtaining a first image having an unknown characteristic. In some implementations, one or more first images having unknown characteristics may be obtained. As indicated above, the unknown characteristic can be associated with the contents depicted in the image. For instance, the unknown characteristic can be associated with a classification or categorization of the contents of the image. As another example, the unknown characteristic can be associated with the detection of an object depicted in the image.

In some implementations, the unknown characteristic can be determined to be unknown based at least in part on one or more machine learning models. For instance, if the machine learning models cannot classify or categorized the image with reasonable certainty, the image can be identified as an unknown image. In particular, if the models provide a certainty probability below a threshold for the image, the image can be identified as an unknown image having an unknown characteristic. As another example, the unknown characteristic can be determined to be unknown if there is a lack of sufficient metadata or other descriptive data associated with the characteristic.

At (206), method (200) can include obtaining a plurality of second images having known characteristics. Similar to the first image, the known characteristics of the second images can be determined based at least in part on the machine learning models and/or metadata associated with the images. In some implementations, the second images can be selected based at least in part on the first image and/or the unknown characteristic of the first image(s).

At (208), method (200) can include generating a CAPTCHA challenge based at least in part on the first and second images. For instance, the CAPTCHA challenge can include the first image and/or at least a subset of the plurality of second images along with instructions that prompt a user to interact with the image(s). As indicated above, in some implementations, the challenge can be selected and/or generated based at least in part on the unknown characteristic of the first image.

At (210), method (200) can include transmitting the CAPTCHA challenge to a plurality of user devices. For instance, the CAPTCHA challenge can be transmitted to a plurality of user devices that seek to gain access to one or more online services or resources associated with one or more resource providers.

At (212), method (200) can include receiving one or more responses to the CAPTCHA challenge from at least a subset of the plurality of user devices. The responses can include data indicative of user interactions with the CAPTCHA challenges. In some implementations, the responses can be used to determine whether to grant access to the users to the online service or resource.

At (214), method (200) can include determining the unknown characteristic of the first image based at least in part on the user responses. For instance, a user's selection and/or interaction with the images provided in the CAPTCHA challenge can be used as evidence of one or more characteristics associated with the first image. For instance, the user responses can be analyzed in view of the instructions provided in the CAPTCHA challenge to determine the one or more characteristics of the first image. In this manner, if enough user responses are indicative of a characteristic of the first image, that characteristic can be inferred. For instance, if enough users select the first image in response to a CAPTCHA challenge instructing the users to select each image that depicts a tiger, then it can be inferred that the first image depicts a tiger.

At (216), method (200) can include training one or more machine learning models based at least in part on the determined characteristic of the first image. For instance, training one or more machine learning models can include providing data indicative of the image and the determined characteristic to a set of training data used to train the models, such that the data indicative of the image and the determined characteristic are added to the training data set. In this manner, the data indicative of the first image can be input into the model(s) and the output of the model(s) can be compared to the determined characteristic. The model(s) can then be adjusted or otherwise refined based at least in part on the comparison.

In some implementations, the first image can then be used in subsequent verification challenges. For instance, the first image can be used as a known image in subsequent CAPTCHA challenges. In this manner, the first image can be added to a set of known images that can be used in CAPTCHA challenges, and removed from a set of unknown images.

Figure 6:
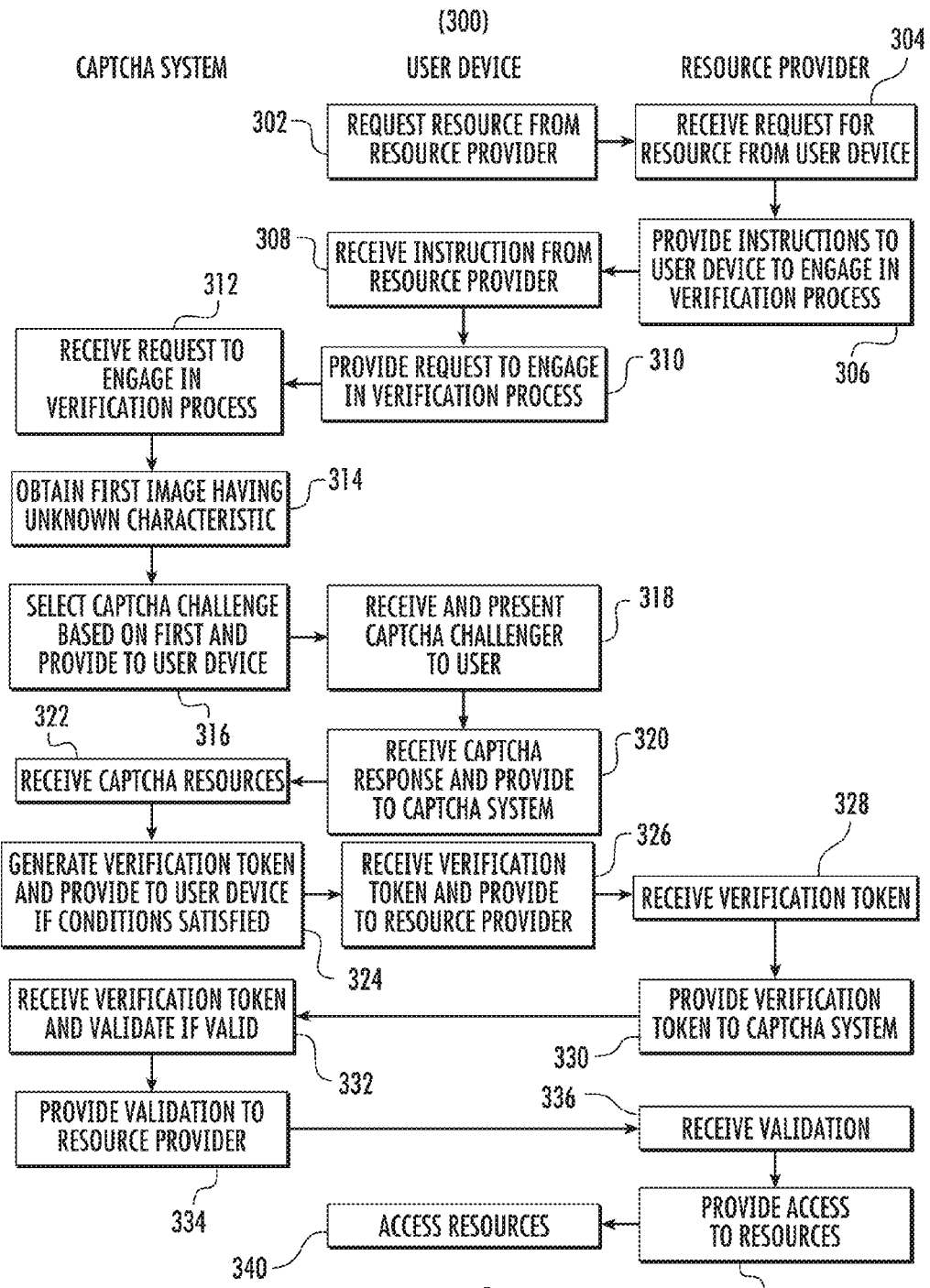
FIG. 6 depicts a flow diagram of an example method of verifying a user according to example embodiments of the present disclosure.

FIG. 6 depicts a flow chart of an example method (300) for verifying a user device according to an example embodiment of the present disclosure. Method (300) can be implemented by one or more computing devices, such as one or more of the computing devices depicted in FIG. 7. In addition, FIG. 6 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (302) a user device can request a resource or access to an online service from a resource provider. At (304) the resource provider can receive the request from the user device.

At (306) the resource provider can instruct the user device to engage in a verification process directly with a computerized CAPTCHA system. At (308) the user device can receive the instructions from the resource provider to directly engage with the computerized CAPTCHA system. As an example, the resource provider can instruct the user device at (306) by redirecting a browser of the user device so that it directly connects with the computerized CAPTCHA system and begins the verification process.

As another example, at (306) the resource provider can provide the user device with a client-side script that, when executed by the user device, causes the user device to directly engage with the computerized CAPTCHA system. For example, the client-side script can be included in an inline frame, embedded object, portlet, or other embedded application or widget. In some implementations, the client-side script can be included in a plug-in provided from the computerized CAPTCHA system to the resource provider. Furthermore, in some implementations, at (306) the resource provider can provide the user device with a public key identifying the resource provider to the computerized CAPTCHA system.

At (310) the user device can transmit a request directly to the computerized CAPTCHA system to engage in a verification process. At (312) the computerized CAPTCHA system can receive the request from the user device.

As an example, the request transmitted at (310) can be formatted according to an application programming interface associated with the computerized CAPTCHA system. For example, the request can be transmitted as a result of executing a client-side script provided to the user device at (306). Furthermore, in some implementations, the request transmitted at (310) can include a public key associated with the resource provider.

At (314) the computerized CAPTCHA system can obtain one or more first images having one or more unknown image characteristics. For instance, a first image can be an image that cannot or has not been classified or categorized within a reasonable certainty. As another example, a first image can be an image wherein the location of an item, object, plant, animal, human, etc. cannot be determined within a reasonable certainty. As indicated above, the unknown image can be determined to be unknown based at least in part on metadata or other descriptive information associated with the image and/or one or more machine learning models.

At (316) the computerized CAPTCHA system can select a CAPTCHA challenge based at least in part on the first image and/or the unknown characteristic of the first image(s) and provide the selected challenge to the user device. For example, the computerized CAPTCHA system can include a database of CAPTCHA challenges having varying formats, difficulties, shapes, sizes, file format, programming language, or other variable parameters. For instance, in some implementations, the CAPTCHA challenge can be image based. In some implementations, selecting the CAPTCHA challenge can include obtaining one or more second images having known image characteristics. As indicated above, the second images can be selected based at least in part on the instructions associated with the CAPTCHA challenge, and/or the first image(s).

As an example, in the instance wherein the contents depicted in the first image(s) obtained at (314) are unknown, the CAPTCHA challenge may be selected to determine a classification of the image. For instance, the CAPTCHA challenge may include a plurality of known images, and the instructions may prompt the user to select each image that shares a particular common characteristic. As indicated above, the CAPTCHA challenge may be tailored such that the user response to the CAPTCHA challenge may be used as evidence to determine and/or narrow down a characteristic of the first image(s). As another example, if the unknown characteristic of the first image is associated with an unknown location of an object in the image, the CAPTCHA challenge may prompt a user to interact with (e.g. select, highlight, annotate, or other interaction) the portion(s) of the image that depict the object.

In some implementations, at (316) a challenge format, challenge type, or other attributes of the challenge can be selected based on various other suitable factors. For example, in the instance that the user device is a mobile device, such as, for example, a smartphone or tablet, then at (316) the computerized CAPTCHA system can select a CAPTCHA challenge designed for a mobile device.

At (318) the user device can receive the CAPTCHA challenge from the computerized CAPTCHA system and present it to the user, for example, on a display of the user device. At (320) the user device can receive one or more responses from the user and transmit the response(s) to the computerized CAPTCHA system. At (322) the computerized CAPTCHA system can receive the response from the user device.

At (324) the computerized CAPTCHA system can generate a verification token and provide it to the user device if one or more verification conditions are satisfied. At (326) the user device can receive the verification token from the computerized CAPTCHA system.

As an example, the computerized CAPTCHA system can generate the verification token and provide it to the user device at (324) if the response received at (322) correctly solves or otherwise satisfies the challenge provided at (316). The verification token can be an authentication certificate or other security or authentication device or mechanism. For example, in some implementations, the verification token can include a hash of a user device identifier or other information or can incorporate the resource provider's public key.

It will be appreciated that, in some implementations, steps (310)-(326) can be considered a verification process. Further, in some implementations, steps (310)-(326) can occur via an inline frame, embedded object, portlet, or other embedded widget or application included in the resource provider's website.

At (328) the user device can provide the verification token to the resource provider. At (330) the resource provider can receive the verification token from the user device.

At (332) the resource provider can transmit the verification token to the computerized CAPTCHA system. In some implementations, at (332) the resource provider can also transmit its private key to the computerized CAPTCHA system together with the verification token.

At (334) the computerized CAPTCHA system can provide a validation of the verification token to the resource provider if the verification token is valid. If the verification token is invalid or has been tampered with, then the computerized CAPTCHA system can inform the resource provider that the verification token is invalid.

At (336) the resource provider can receive the validation of the verification token from the computerized CAPTCHA system. In response to receiving the validation at (336), at (338) the resource provider can provide the user device with access to the resource. At (340) the user device can access the resource.

Figure 7:
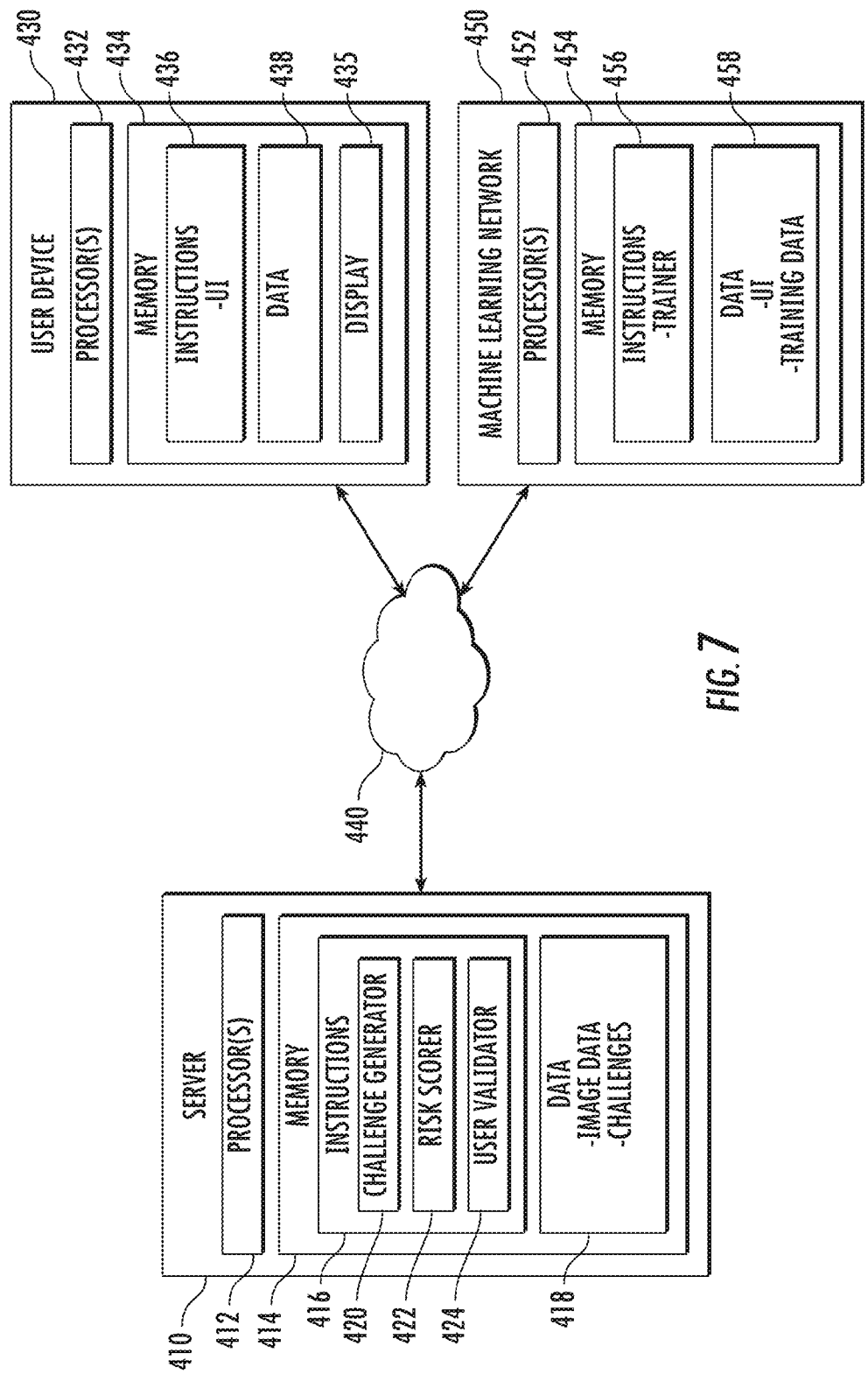
FIG. 7 depicts an example system according to example embodiments of the present disclosure.

FIG. 7 depicts an example computing system 400 that can be used to implement the methods and systems according to example aspects of the present disclosure. The system 400 can be implemented using a client-server architecture that includes a server 410 that communicates with one or more client devices 430 over a network 440. The system 400 can be implemented using other suitable architectures, such as a single computing device.

The system 400 includes a server 410, such as a web server. The server 410 can host a computerized CAPTCHA system configured to grant or deny access to online services or resources. The server 410 can be implemented using any suitable computing device(s). The server 410 can have one or more processors 412 and one or more memory devices 414. The server 410 can also include a network interface used to communicate with one or more client devices 430 over the network 440. The network interface can include any suitable components for interfacing with one more networks, including for example, transmitters, receivers, ports, controllers, antennas, or other suitable components.

The one or more processors 412 can include any suitable processing device, such as a microprocessor, microcontroller, integrated circuit, logic device, or other suitable processing device. The one or more memory devices 414 can include one or more computer-readable media, including, but not limited to, non-transitory computer-readable media, RAM, ROM, hard drives, flash drives, or other memory devices. The one or more memory devices 414 can store information accessible by the one or more processors 412, including computer-readable instructions 416 that can be executed by the one or more processors 412. The instructions 416 can be any set of instructions that when executed by the one or more processors 412, cause the one or more processors 412 to perform operations. For instance, the instructions 416 can be executed by the one or more processors 412 to implement, for instance, a challenge generator 420, a user validator 422, and an Image Classifier 424. For instance, challenge generator 420 can be configured to obtain one or more unknown images and/or one or more known images, and to generate a CAPTCHA challenge based at least in part on the images. User validator 422 can be configured to receive user responses to the CAPTCHA challenge and to determine whether to grant access to the users based at least in part on the responses. Image classifier 424 can be configured to determine one or more characteristics of the unknown images based at least in part on the user responses, and to provide the images and the determined characteristics to a machine learning network 450.

As shown in FIG. 7, the one or more memory devices 414 can also store data 418 that can be retrieved, manipulated, created, or stored by the one or more processors 412. The data 418 can include, for instance, image data, challenge data, and other data. The data 418 can be stored in one or more databases. The one or more databases can be connected to the server 410 by a high bandwidth LAN or WAN, or can also be connected to server 410 through network 440. The one or more databases can be split up so that they are located in multiple locales.

The server 410 can exchange data with one or more client devices 430 over the network 440. Although one client devices 430 are illustrated in FIG. 7, any number of client devices 430 can be connected to the server 410 over the network 440. Each of the client devices 430 can be any suitable type of computing device, such as a general purpose computer, special purpose computer, laptop, desktop, mobile device, navigation system, smartphone, tablet, wearable computing device, a display with one or more processors, or other suitable computing device.

Similar to the server 410, a client device 430 can include one or more processor(s) 432 and a memory 434. The one or more processor(s) 432 can include one or more central processing units (CPUs), graphics processing units (GPUs) dedicated to efficiently rendering images or performing other specialized calculations, and/or other processing devices. The memory 434 can include one or more computer-readable media and can store information accessible by the one or more processors 432, including instructions 436 that can be executed by the one or more processors 432 and data 438. For instance, the memory 434 can store instructions 436 for implementing a user interface module for displaying CAPTCHA challenges according to example aspects of the present disclosure.

The client device 430 of FIG. 7 can include various input/output devices for providing and receiving information from a user, such as a touch screen, touch pad, data entry keys, speakers, and/or a microphone suitable for voice recognition. For instance, the client device 430 can have a display device 435 for presenting a user interface displaying semantic place names according to example aspects of the present disclosure.

The client device 430 can also include a network interface used to communicate with one or more remote computing devices (e.g. server 410) over the network 440. The network interface can include any suitable components for interfacing with one more networks, including for example, transmitters, receivers, ports, controllers, antennas, or other suitable components.

The network 440 can be any type of communications network, such as a local area network (e.g. intranet), wide area network (e.g. Internet), cellular network, or some combination thereof. The network 440 can also include a direct connection between a client device 430 and the server 410. In general, communication between the server 410 and a client device 430 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The server 410 can also exchange data with one or more machine learning networks, such as machine learning network 450. Similar to the server 410 and client device 430, machine learning network can include one or more processor(s) 452 and a memory 454. The one or more processor(s) 452 can include one or more central processing units (CPUs) and/or other processing devices. The memory 454 can include one or more computer-readable media and can store information accessible by the one or more processors 452, including instructions 456 that can be executed by the one or more processors 452 and data 458. For instance, the memory 454 can store instructions 456 for implementing a model trainer configured to train one or more machine learning models. Data 458 can include one or more models and training data. The machine learning network 450 can also include a network interface used to communicate with one or more remote computing devices (e.g. server 410) over the network 440.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of providing access to a resource, the method comprising:

obtaining, by the one or more computing devices, one or more first images having an unknown characteristic and one or more second images having a known characteristic;

providing, by the one or more computing devices, the one or more first images and the one or more second images to a user device in a verification challenge, the verification challenge comprising one or more instructions to be presented to a user of the user device, the instructions being determined based at least in part on the unknown characteristic of the one or more first images and the known characteristic of the one or more second images;

receiving, by the one or more computing devices, a response to the verification challenge from the user device;

determining, by the one or more computing devices, the unknown characteristic of the one or more first images based at least in part on the received response;

providing, by the one or more computing devices, a verification token to the user device, in response to determining the unknown characteristic of the one or more first images;

receiving, by the one or more computing devices, the verification token from a resource provider, in response to providing the verification token to the user device;

validating, by the one or more computing devices, the verification token from the resource provider; and providing, by the one or more computing devices, data indicative of the validation to the resource provider, to provide the user device with access to a resource controlled by the resource provider.

2. The computer-implemented method of claim 1, further comprising receiving, by one or more computing devices, a request to engage in a verification process from a user computing device, and wherein the one or more first images are obtained responsive to receiving the request.

3. The computer-implemented method of claim 1, further comprising:

obtaining, by the one or more computing devices, a plurality of second images having known characteristics; and providing, by the one or more computing devices, at least a subset of the plurality of second images along with the one or more first images in the verification challenge.

4. The computer-implemented method of claim 1, wherein the unknown characteristic of the one or more first images is determined to be unknown based at least in part on the one or more machine learning models, the one or more machine learning models configured to receive one or more images as an input and to determine one or more characteristics of the one or more images as an output.

5. The computer-implemented method of claim 4, wherein the one or more characteristics of the one or more images relate to one or more items or objects depicted in the one or more images.

6. The computer-implemented method of claim 4, wherein the one or more machine learning models are further configured to provide a certainty probability indicative of a degree of certainty that the output of the model is correct.

7. The computer-implemented method of claim 6, wherein the unknown characteristic of the one or more first images is determined to be unknown when the certainty probability associated with the one or more first images is below a certainty threshold.

8. The computer-implemented method of claim 4, wherein the known characteristics of the plurality of second images are determined based at least in part on the one or more machine learning models.

9. The computer-implemented method of claim 3, wherein the one or more instructions associated with the verification challenge prompts the user to interact with one or more of the first or second images that meet a criterion.

10. The computer-implemented method of claim 1, wherein the one or more instructions associated with the verification challenge prompts the user to interact with at least a portion of the one or more first images that meets a criterion.

11. The computer-implemented method of claim 10, wherein the one or more instructions associated with the verification challenge prompt the user to select a portion of at least one of the one or more first images.

12. The computer-implemented method of claim 1, wherein the verification challenge is determined based at least in part on the unknown characteristic of the one or more first images.

13. The computer-implemented method of claim 3, further comprising providing, by the one or more computing devices, a third image in the verification challenge, the third image depicting an item or object, and wherein the one or more instructions associated with the verification challenge prompt the user to select one or more of the one or more first images or the at least a subset of second images that depict an item or object that from the same classification as the item or object depicted in the third image.

14. The computer-implemented method of claim 1, further comprising determining, by the one or more computing devices, whether to verify the plurality user device based at least in part on the responses to the verification challenge.

15. The computer-implemented method of claim 1, wherein determining, by the one or more computing devices, the unknown characteristic of the one or more first images comprises inferring, by the one or more computing devices, the unknown characteristic of the one or more first images when a threshold number of user responses are indicative of a characteristic of the one or more first images.

16. A computing system, comprising:

one or more processors; and one or more memory devices, the one or more memory devices storing computer-readable instructions that when executed by the one or more processors cause the one or more processors to perform operations, the operations comprising:

obtaining a first image having an unknown characteristic and a second image having a known characteristic;

providing the first image and the second image to a user device in a verification challenge, the verification challenge providing one or more instructions to the user based at least in part on the unknown characteristic of the first image and the known characteristic of the second image;

receiving a response to the verification challenge from the user device;

determining the unknown characteristic of the first image based at least in part on the received response;

providing a verification token to the user device, in response to determining the unknown characteristic of the first image;

receiving the verification token from a resource provider, in response to providing the verification token to the user device;

validating the verification token received from the resource provider; and providing data indicative of the validation to the resource provider, to provide the user device with access to a resource controlled by the resource provider.

17. The computing system of claim 16, further comprising:

obtaining a plurality of second images having known characteristics; and providing at least a subset of the plurality of second images along with the first image in the verification challenge.

18. The computing system of claim 17, wherein determining the unknown characteristic of the first image comprises inferring the unknown characteristic of the first image when a threshold number of user responses are indicative of a characteristic of the first image.

19. One or more tangible, non-transitory computer-readable media storing computer-readable instructions that when executed by one or more processors cause the one or more processors to perform operations, the operations comprising:

obtaining a first image having an unknown characteristic and a second image having a known characteristic;

providing the first image and the second image to a user device in a verification challenge, the verification challenge providing one or more instructions to the user based at least in part on the first image;

receiving a response to the verification challenge from the user device;

determining the unknown characteristic of the first image based at least in part on the received response;

providing a verification token to the user device, in response to determining the unknown characteristic of the first image;

receiving the verification token from a resource provider, in response to providing the verification token to the user device;

validating the verification token received from the resource provider; and providing data indicative of the validation to the resource provider, to provide the user device with access to a resource controlled by the resource provider.

20. The one or more tangible, non-transitory computer-readable media of claim 19 wherein determining the unknown characteristic of the first image comprises inferring the unknown characteristic of the first image when a threshold number of user responses are indicative of a characteristic of the first image.

* * * * *